(12) United States Patent
Bitto et al.

(10) Patent No.: US 7,992,452 B2
(45) Date of Patent: Aug. 9, 2011

(54) MEASURING TRANSDUCER OF VIBRATION TYPE

(75) Inventors: Ennio Bitto, Aesch (CH); Martin Anklin-Imhof, Dornach (CH); Gerhard Eckert, Rheinfelden (DE); Dieter Mundschin, Liestal (CH)

(73) Assignee: Endress + Hauser Flowtec AG, Reinach (CH)

( * ) Notice: Subject to any disclaimer, the term of this patent is extended or adjusted under 35 U.S.C. 154(b) by 79 days.

(21) Appl. No.: 12/458,862

(22) Filed: Jul. 24, 2009

(65) Prior Publication Data
US 2010/0037707 A1 Feb. 18, 2010

(30) Foreign Application Priority Data

Aug. 14, 2008 (DE) .......................... 10 2008 037 700

(51) Int. Cl.
*G01F 1/84* (2006.01)
(52) U.S. Cl. .................................................. 73/861.355
(58) Field of Classification Search ............. 73/861.355, 73/861.356, 861.357
See application file for complete search history.

(56) References Cited

U.S. PATENT DOCUMENTS

| | | | |
|---|---|---|---|
| 4,674,337 A * | 6/1987 | Jonas | ......................... 73/861.73 |
| 4,957,005 A | 9/1990 | Yard | |
| 7,392,709 B2 * | 7/2008 | Eckert | ....................... 73/861.355 |
| 2001/0029790 A1 | 10/2001 | Ollila | |

FOREIGN PATENT DOCUMENTS

| | | |
|---|---|---|
| CH | 641 277 A5 | 2/1984 |
| DE | 37 88 374 T2 | 4/1994 |
| DE | 690 17 008 T2 | 6/1995 |
| DE | 295 11 888 U1 | 1/1997 |
| DE | 296 09 624 U1 | 11/1997 |
| DE | 600 36 859 T2 | 7/2008 |
| EP | 0 518 124 A1 | 12/1992 |
| EP | 0 601 256 B1 | 6/1994 |
| EP | 0 668 992 B1 | 8/1995 |
| EP | 1 001 254 A1 | 5/2000 |
| WO | WO 2007/074014 A1 | 7/2007 |

\* cited by examiner

*Primary Examiner* — Jewel Thompson
(74) *Attorney, Agent, or Firm* — Bacon & Thomas, PLLC

(57) ABSTRACT

A measuring transducer of vibration type for registering, on the basis of the Coriolis principle, at least one measured variable of a medium flowing through a pipeline. The measuring transducer includes: a measuring tube, which is connectable with the pipeline via an inlet and an outlet, wherein the measuring tube includes a first measuring tube arc and a second measuring tube arc; an oscillation exciter for exciting oscillations of the measuring tube arcs; at least one oscillation sensor for registering resulting oscillations of the measuring tube arcs; and a transducer housing surrounding the measuring tube arcs. The measuring tube arcs are elastically coupled to the transducer housing. In this way, a robust and reliable measuring operation is guaranteed, which is little influenced by oscillatory in-couplings.

28 Claims, 2 Drawing Sheets

MEASURING TRANSDUCER OF VIBRATION TYPE

TECHNICAL FIELD

The invention relates to a measuring transducer of the vibration type for registering, on the basis of the Coriolis principle, at least one measured variable of a medium flowing through a pipeline. The measuring transducer includes: a measuring tube, which is connectable with the pipeline via an inlet and an outlet, wherein the measuring tube includes a first measuring tube arc and a second measuring tube arc; an oscillation exciter for exciting oscillations of the measuring tube arcs; at least one oscillation sensor for registering resulting oscillations of the measuring tube arcs; and a transducer housing surrounding the measuring tube arcs.

BACKGROUND DISCUSSION

Such a measuring transducer is known from published US Application No. 2001/0029790 A1. The Coriolis measuring transducer described there, as well as other measuring transducers with two measuring tube arcs, have the advantage that, in operation, when the measuring tube arcs are oscillating, the center of mass of the entire measuring tube can be kept essentially constant. This is especially implementable by exciting the two measuring tube arcs to oscillations which are of opposite phase. In this way, one obtains, in total, an oscillation system, which, externally, e.g. relative to the pipeline system, in which it is installed, behaves essentially neutrally. Oscillation transfers from the measuring transducer to the pipeline system and especially associated therewith, uncontrolled feedback, which would corrupt the registering of the measured variable of the medium flowing through the pipeline, can, in this way, be strongly reduced.

In the case of measuring transducers of the type being discussed, the installation into a pipeline occurs via the inlet and the outlet of the measuring transducer. The inlet and the outlet of the measuring transducer are, in such case, typically rigidly connected with the transducer housing of the measuring transducer surrounding the measuring tube arcs. In order, now, to avoid, that the entire unit composed of a measuring tube with the two measuring tube arcs, as well as an oscillation exciter and an oscillation sensor, is only suspended at the two locations on the transducer housing, where the measuring tube is secured, inflow side and outflow side, respectively, rigidly to a wall of the transducer housing, according to the noted published US Application No. 2001/0029790, the following construction is provided: a so-called anchor is secured rigidly to the transducer housing, wherein the two measuring tube arcs are, in each case, rigidly clamped in a beginning region and an end region into this anchor. In this way, a stable system is achieved, since oscillations of the entire structure composed of the two measuring tube arcs, the oscillation exciter and the oscillation sensor within the transducer housing between the rigid connection of the inlet and outlet, respectively, to walls of the transducer housing, e.g. due to externally in-coupled oscillations or forces, are avoided.

In the known measuring transducer of the vibration type, from which the invention starts, the susceptibility to disturbance relative to externally in-coupled oscillations is, however, not yet satisfactory.

SUMMARY OF THE INVENTION

Therefore, it is an object of the invention to provide a measuring transducer of the vibration type of this sort, which, with small and cost-effective design, is robust and reliable for measuring purposes.

Proceeding from the above described measuring transducer, this object is achieved by elastically coupling the measuring tube arcs to the transducer housing.

The invention thus follows a completely new path, wherein a rigid affixing of the measuring tube arcs via an anchor to the transducer housing is avoided and, instead, an elastic coupling of the measuring tube arcs to the transducer housing is provided. Such an elastic coupling of the measuring tube arcs to the transducer housing is advantageous in that, therewith, oscillatory couplings from the exterior into the measuring tube can be further reduced.

Basically, the measuring tube arcs can be coupled elastically to the transducer housing in various ways. According to a preferred further development of the invention, it is, however, provided that a rigid connecting element rigidly connecting the two measuring tube arcs together is coupled elastically to the transducer housing. This means that the measuring tube arcs are, in each case, in any case, at one location, connected rigidly together, namely by means of the rigid connecting element, which then itself has an elastic coupling to the transducer housing.

The embodiment of the measuring tube arcs, especially their arrangement relative to one another in space, can follow various designs. According to a preferred further development of the invention, it is, however, provided, that the measuring tube arcs are arranged, at least regionally, in planes extending parallel to one another. As a result, one achieves therewith a double arc construction with two measuring tube arcs extending, for the most part, in two mutually planparallel planes. Through this parallel arrangement of the measuring tube arcs, which is provided at least sectionally, but preferably along the greatest part of the tube arcs, it is possible to achieve, in an especially efficient manner, the above mentioned oscillatory neutrality on the basis of a center of mass which is essentially at rest during operation.

According to a preferred further development of the invention, it is further provided that the first measuring tube arc has an inlet arc region and the second measuring tube arc has an outlet arc region, wherein the inlet arc region and the outlet arc region are, in each case, provided outside of the mutually parallel planes and lead to the inlet and to the outlet, respectively, and wherein the rigid connecting element rigidly connecting the two measuring tube arcs together is rigidly secured to the inlet arc region and to the outlet arc region. As a result, it is possible, therewith to achieve a construction in the case of which the two measuring tube arcs extend planparallel to one another in their greatest region, wherein solely in the inlet arc region, thus in the region, which leads from the inlet to the first measuring tube arc, and in the outlet arc region, thus in the region, which leads to the outlet of the second measuring tube arc, the respective sections of the measuring tube lie outside of the planparallel planes. Exactly in these sections, which lie outside of the planparallel planes, is the rigid affixing with the connecting element provided.

In this described, preferred further development of the invention, preferably, further between the first measuring tube arc and the second measuring tube arc there is provided a connecting arc region connecting the first measuring tube arc with the second measuring tube arc. This connecting arc region extends outside of the planes extending mutually parallel to one another. The rigid connecting element connecting the two measuring tube arcs rigidly together is additionally rigidly secured to the connecting arc region. This means, thus, that the measuring tube is affixed at three locations to the connecting element, namely at the inlet arc region, at the outlet arc region and at the connecting arc region between the two measuring tube arcs, wherein all these regions concern, in each case, measuring tube regions, which lie outside of the planparallel planes of the greatest sections of the measuring tube arcs.

The elastic coupling of the measuring tube arcs to the transducer housing can be accomplished with various systems in various embodiments.

According to a preferred further development of the invention, it is, however, provided that, for elastic coupling of the measuring tube arcs to the transducer housing, a support frame elastically coupled with the rigid connecting element connecting the two measuring tube arcs rigidly together is provided. According to this preferred further development of the invention, thus, both on the side of the measuring tube, namely in the form of the connecting element, as well as also on the side of the transducer housing, namely in the form of the support frame, a rigid element is provided, wherein the elastic coupling occurs between these two rigid elements. According to a preferred further development of the invention, an elastic damping element is provided between the support frame and the rigid connecting element. Thus, for the elastic coupling of the measuring tube to the transducer housing, such an element is applied, which is not only elastic, but also damping, thus additionally opposes the transfer of oscillations.

As regards the damping element and its embodiment and securement, there are various possibilities. According to a preferred further development of the invention, it is, however, provided that there is rigidly connected to the rigid connecting element a sleeve, the elastic damping element is led through the sleeve, the support frame has a plurality of feet, with which it is rigidly secured to the transducer housing, and the damping element is clamped between the sleeve and the support element. This is a construction, which has especially proven itself for a measuring transducer of vibration type working according to the Coriolis principle.

According to a preferred further development of the invention, it is especially provided, that the elastic damping element is prestressed. In the case of the above described construction, it is, insofar, provided according to a preferred further development of the invention, that the support element has a prestressing system for prestressing the damping element.

According to a preferred further development of the invention, it is further provided that the inlet and the outlet are rigidly connected with the transducer housing. Especially, it is insofar preferred, that the inlet and the outlet are, in each case, led through a wall of the transducer housing. Finally, according to a preferred further development of the invention in this regard, it is provided that the measuring tube arcs are elastically coupled to a wall of the transducer housing, which is different from the walls through which the inlet and the outlet are each led.

Furthermore, according to a preferred further development of the invention, the oscillation exciter and/or the oscillation sensor, preferably two oscillation sensors, are arranged in such a manner that they act between the two measuring tube arcs. In this connection, it is especially provided that oscillations of the measuring tube arcs of opposite phase are excitable with the oscillation exciter.

BRIEF DESCRIPTION OF THE DRAWINGS

The invention will now be explained in greater detail on the basis of the drawing, the figures of which show as follows.

DETAILED DISCUSSION IN CONJUNCTION WITH THE DRAWINGS

Figure 1:
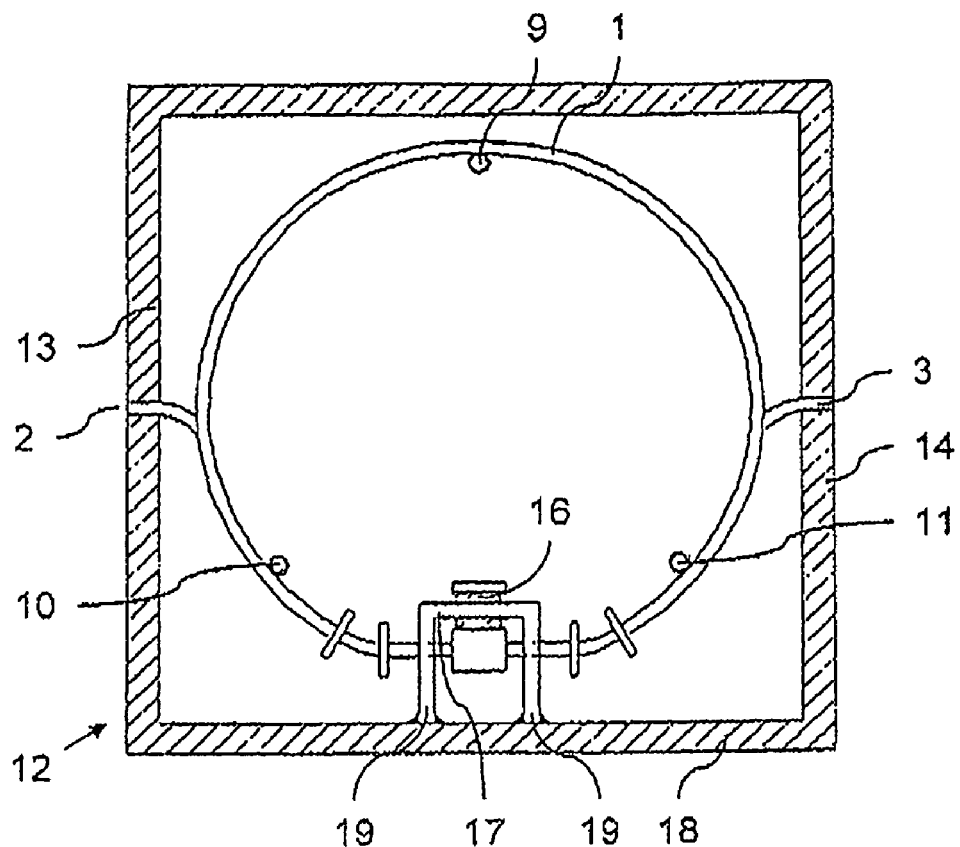
FIG. 1 is a measuring transducer according to a first preferred form of embodiment of the invention, in side view.
Figure 2:
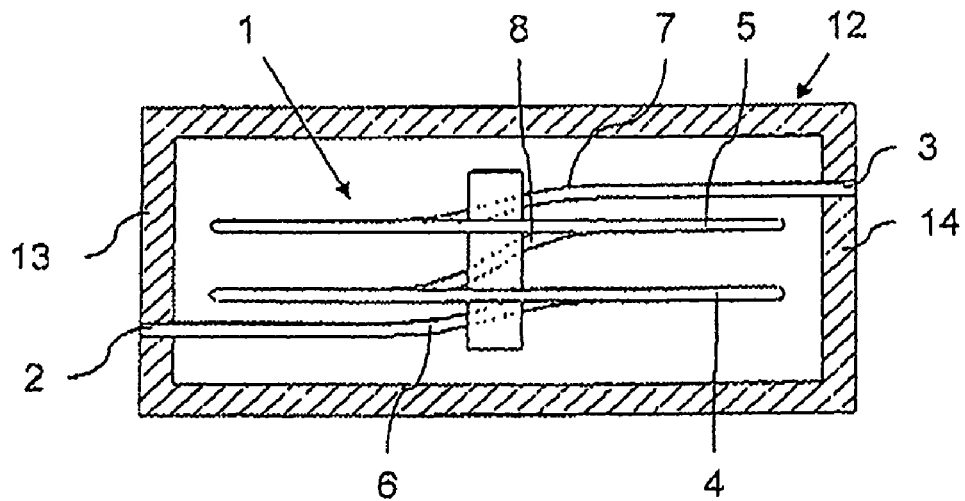
FIG. 2 is the measuring transducer according to the first preferred form of embodiment of the invention, in plan view.

FIG. 1 shows in a side view a measuring transducer of vibration type according to a first preferred form of embodiment of the invention. This measuring transducer is provided for registering, on the basis of the Coriolis principle, at least one measured variable, such as the mass flow, of a medium flowing through a pipeline. The measuring transducer includes a measuring tube 1, which is connectable with a pipeline (not shown) via an inlet 2 and an outlet 3. Additionally, the measuring tube includes a first measuring tube arc 4 and a second measuring tube arc 5, such as visible especially in FIG. 2. FIG. 2 also shows that the first measuring tube arc 4 and the second measuring tube arc 5 lie with their main sections in planes planparallel to one another. Not lying in one of these two planes is an inlet arc region 6 of the measuring tube 1, which leads from the inlet 2 to the first measuring tube arc 4, an outlet arc region 7, which leads from the second measuring tube arc 5 to the outlet 3, and a connecting tube region 8, which connects the first measuring tube arc 4 with the second measuring tube arc 5.

Furthermore, an oscillation exciter 9 is provided, which acts between the two measuring tube arcs 4, 5, and with which the two measuring tube arcs 4, 5 are excitable to execute oscillations of opposite phase. For registering the resulting oscillations, two oscillation sensors 10, 11 are provided, which likewise are arranged between the two measuring tube arcs 4, 5. With the help of these two oscillation sensors 10, 11, e.g. mass flow can be determined, in manner known to those skilled in the art, on the basis of Coriolis force caused, phase differences of the registered oscillations at the different locations of application of the oscillation sensors 10, 11.

The total construction composed of measuring tube 1 with the measuring tube arcs 4, 5 and the oscillation sensors 10, 11 and the oscillation exciter 9 arranged therebetween is surrounded by a transducer housing 12. In oppositely lying walls 13, 14 of the transducer 12, the inlet 2 and the outlet 3 of the measuring tube 1 are affixed, namely by welding. Additionally, the inlet 2 and the outlet 3 are led through the respective walls 13, 14, in order to assure, in this way, a connection to the pipeline system.

Essential, now, is that the measuring tube arcs 4, 5 are rigidly connected together by means of a rigid connecting element 15, wherein the connecting element is coupled elastically to the transducer housing 12. In detail, for this, the connecting element 15 is connected to the inlet arc region 6, the outlet arc region 7 and the connecting arc region 8 and with a support frame 17 via an elastic damping element 16, which is affixed in turn to a wall 18 of the transducer housing 12, being, namely, welded thereto. The support frame 17 includes, for this purpose, a plurality of feet 19, which are welded to the wall 18 of the transducer housing 12. A connection of the support frame 17 to the measuring tube 1 and therewith to the oscillating system, occurs exclusively via the damping element 16, which in turn is connected with the rigid connecting element 15. In detail, the damping element 16 stands prestressed between the support frame 17 and the connecting element 15, in order to assure a defined zero position. Moreover, in this way, the damping characteristic of the damping element is improved.

Figure 3:
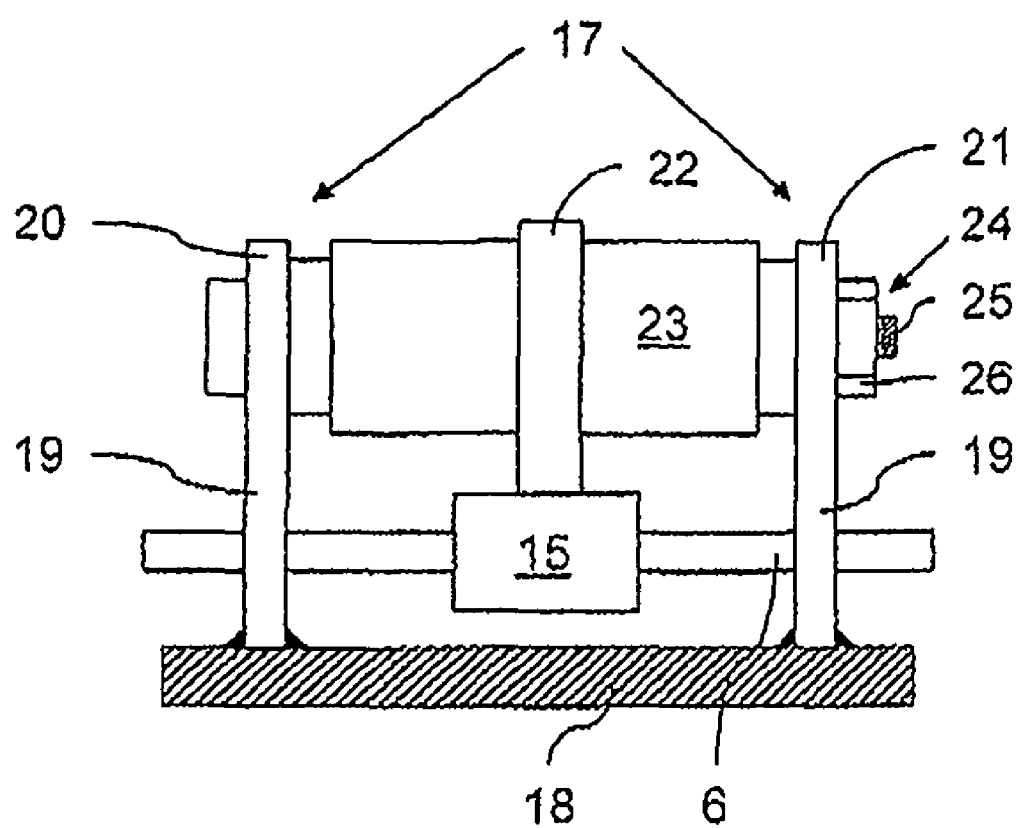
FIG. 3 is the embodiment of the elastic coupling of the measuring tube arcs to the transducer housing according to a second preferred form of embodiment of the invention.

Alternatively to the measuring transducer shown in FIGS. 1 and 2 for the first preferred form of embodiment of the invention, as shown in FIG. 3, an elastic coupling of the measuring tube 1 to the transducer housing 12 is provided as follows: The support frame 17 is welded to the wall 18 of the transducer housing 12, with the support frame 17 including a first support frame element 20 and a second support frame element 21. The support frame 17 further includes a plurality of feet 19. To the corresponding sections of the measuring tube 1, here visible on the inlet arc region 6, the connecting element 15 is affixed, to which a sleeve 23 is secured by means of a holding element 22. Within this sleeve is located the damping element 16, which here is manufactured from a rubber or plastic material. The damping element 16 lies against the interior of the sleeve 23 and contacts additionally the inner side of the first support frame 20 and the inner side of the second support frame element 21. Furthermore, a prestressing system 24 is provided for prestressing the damping element 16, such being formed by a screw 25 led through the first support frame element 20 and the second support frame element 21, as well as the damping element 16. Screw 25 can be pulled by means of a nut 26. In this way, the damping element 16 can be compressed and thus prestressed clamped between the support frame 17 and the connecting element 15. There results a stable and simultaneously damped, elastic connection of the oscillatory system, namely the measuring tube 1 with the oscillation exciter 9 and the oscillation sensors 10, 11, with the transducer housing 12, which leads overall to a small disturbance susceptibility of the measuring transducer relative to externally acting oscillation in-couplings. In this way, a robust and reliable measuring operation is guaranteed.

The invention claimed is:

1. A measuring transducer of the vibration type, for registering, on the basis of the Coriolis principle, at least one measured variable of a medium flowing through a pipeline, said measuring transducer comprising:
    a measuring tube, which is connectable with the pipeline via an inlet and an outlet,
    said measuring tube including a first measuring tube arc, which includes an inlet arc region, and a second measuring tube arc, which includes an outlet arc region, said first and second measuring tube arcs are arranged at last regionally in two planes extending parallel to one another, and
    said measuring tube including a connecting arc region, provided between said first and second measuring tube arcs, for connecting said first measuring tube arc with said second measuring tube arc, said connecting arc region extends outside of the planes extending parallel to one another;
    a rigid connecting element rigidly connecting said first and second measuring tube arcs together, said rigid connecting element is rigidly secured to said inlet arc region and to said outlet arc region, and said rigid connecting element is rigidly secured to said connecting arc region;
    an oscillation exciter for exciting oscillations of said first and second measuring tube arcs;
    at least one oscillation sensor for registering resulting oscillations of said first and second measuring tube arcs; and
    a transducer housing surrounding said first and second measuring tube arcs, wherein:
    said first and second measuring tube arcs are elastically coupled to said transducer housing, and said rigid connecting element is elastically coupled to said transducer housing.

2. The measuring transducer as claimed in claim 1, further comprising:
    a support frame for elastic coupling of said measuring tube arcs to said transducer housing, said support frame being elastically coupled with said rigid connecting element.

3. The measuring transducer as claimed in claim 1, wherein:
    said inlet and said outlet led through a wall of said transducer housing and are rigidly connected with said transducer housing.

4. The measuring transducer as claimed in claim 3, wherein:
    said first and second measuring tube arcs are elastically coupled to a wall of said transducer housing, which is different from the walls through which said inlet and said outlet are each led.

5. The measuring transducer as claimed in claim 2, further comprising:
    an elastic damping element provided between said support frame and said rigid connecting element.

6. A measuring transducer of the vibration type, for registering on the basis of the Coriolis principle, as least one measured variable of a medium flowing through a pipeline, said measuring transducer comprising:
    a measuring tube, which is connectable with the pipeline via an inlet and an outlet, said measuring tube includes a first measuring tube arc and a second measuring tube arc;
    an oscillation exciter for exciting oscillations of said measuring tube arcs:
    at least one oscillation sensor for registering resulting oscillations of said measuring tube arcs:
    a transducer housing surrounding said measuring tube arcs: and
    a support frame for elastic coupling of said measuring tube arcs to said transducer housing, said support frame being elastically coupled with said rigid connecting element rigidly connecting said two measuring tube arcs together; wherein:
    said measuring tube arcs are elastically coupled to said transducer housing.

7. The measuring transducer as claimed in claim 6, further comprising:
    an elastic damping element provided between said support frame and said rigid connecting element.

8. The measuring transducer as claimed in claim 7, wherein:
    there is rigidly secured to said rigid connecting element a sleeve, said elastic damping element is led through said sleeve;
    said support frame includes a plurality of feet, with which it is rigidly secured to said transducer housing; and
    said damping element is clamped between said sleeve and said support frame.

9. The measuring transducer as claimed in claim 7, wherein:
    said elastic damping element is prestressed.

10. The measuring transducer as claimed in claim 7, further comprising:
    a prestressing system for prestressing said elastic damping element.

11. The measuring transducer as claimed in claim 1, wherein:
    said inlet and said outlet are rigidly connected with said transducer housing.

12. The measuring transducer as claimed in claim 11, wherein:
said inlet and said outlet are each led through a wall of said transducer housing.

13. A measuring transducer of the vibration type, for registering, on the basis of the Coriolis principle, at least one measured variable of a medium flowing through a pipeline, said measuring transducer comprising:
a measuring tube, which is connectable with the pipeline via an inlet and an outlet, said measuring tube includes a first measuring tube arc and a second measuring tube arc:
an oscillation exciter for exciting oscillations of said measuring tube arcs;
at least one oscillation sensor for registering resulting oscillations of said measuring tube arcs: and
a transducer housing surrounding said measuring tube arcs, wherein:
said inlet and said outlet led through a wall of said transducer housing and are rigidly connected with said transducer housing, and
said measuring tube arcs are elastically coupled to a wall of said transducer housing, which is different from the walls through which said inlet and said outlet are each led.

14. The measuring transducer as claimed in claim 1, wherein:
said oscillation exciter and/or said oscillation sensor are provided between said two measuring tube arcs.

15. The measuring transducer as claimed in claim 14, wherein:
oscillations of said measuring tube arcs of opposite phase are excitable with said oscillation exciter.

16. The measuring transducer as claimed in claim 5, further comprising: a sleeve rigidly secured to said rigid connecting element.

17. The measuring transducer as claimed in claim 16, wherein: said elastic damping element is led through said sleeve.

18. The measuring transducer as claimed in claim 17, wherein: said damping element is clamped between said sleeve and said support frame.

19. The measuring transducer as claimed in claim 18, wherein: said support frame includes a plurality of feet, with which it is rigidly secured to said transducer housing.

20. The measuring transducer as claimed in claim 16, wherein: said support frame includes a plurality of feet for rigidly securing the support frame to said transducer housing.

21. The measuring transducer as claimed in claim 6, wherein: said oscillation exciter and/or said oscillation sensor are provided between said two measuring tube arcs.

22. The measuring transducer as claimed in claim 13, wherein: said oscillation exciter and/or said oscillation sensor are provided between said two measuring tube arcs.

23. The measuring transducer as claimed in claim 13, further comprising: a support frame for elastic coupling of said measuring tube arcs to said transducer housing, said support frame being elastically coupled with said rigid connecting element rigidly connecting said two measuring tube arcs together.

24. The measuring transducer as claimed in claim 23, further comprising: an elastic damping element provided between said support frame and said rigid connecting element.

25. The measuring transducer as claimed in 24, further comprising:
a sleeve rigidly secured to said rigid connecting element.

26. The measuring transducer as claimed in claim 25, wherein: said elastic damping element is led through said sleeve.

27. The measuring transducer as claimed in claim 26, wherein: said support frame includes a plurality of feet, with which it is rigidly secured to said transducer housing.

28. The measuring transducer as claimed in claim 23, wherein: said support frame includes a plurality of feet for rigidly securing the support frame to said transducer housing.

* * * * *